(12) United States Patent
Pala

(10) Patent No.: US 12,155,668 B1
(45) Date of Patent: Nov. 26, 2024

(54) ATA SYSTEMS AND METHODS FOR ADVANCED DYNAMIC TRUST STORE MANAGEMENT SYSTEMS

(71) Applicant: CABLE TELEVISION LABORATORIES, INC., Louisville, CO (US)

(72) Inventor: Massimiliano Pala, Denver, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 310 days.

(21) Appl. No.: 17/681,180

(22) Filed: Feb. 25, 2022

Related U.S. Application Data

(60) Provisional application No. 63/153,554, filed on Feb. 25, 2021.

(51) Int. Cl.
  *H04L 9/40* (2022.01)
  *H04L 61/4511* (2022.01)

(52) U.S. Cl.
  CPC .......... *H04L 63/102* (2013.01); *H04L 63/123* (2013.01); *H04L 61/4511* (2022.05); *H04L 63/168* (2013.01)

(58) Field of Classification Search
  CPC ... H04L 63/123; H04L 63/168; H04L 61/4511
  See application file for complete search history.

(56) References Cited

U.S. PATENT DOCUMENTS

| | | | | |
|---|---|---|---|---|
| 10,848,301 | B1* | 11/2020 | Fregly | H04L 61/4511 |
| 2008/0101358 | A1* | 5/2008 | Van Ewijk | H04L 61/4552 370/389 |
| 2010/0121981 | A1* | 5/2010 | Drako | H04L 61/4511 709/245 |
| 2010/0186079 | A1* | 7/2010 | Nice | H04L 61/4511 726/14 |
| 2011/0055374 | A1* | 3/2011 | Christenson | H04L 61/4511 709/224 |
| 2014/0244998 | A1* | 8/2014 | Amenedo | H04L 63/126 713/156 |
| 2016/0380773 | A1* | 12/2016 | Woodworth | H04L 9/3247 713/176 |
| 2017/0012780 | A1* | 1/2017 | Kaliski, Jr. | H04L 61/4552 |
| 2017/0012943 | A1* | 1/2017 | Kaliski, Jr. | H04L 63/0428 |
| 2018/0062856 | A1* | 3/2018 | Kaliski, Jr. | H04L 9/006 |

(Continued)

OTHER PUBLICATIONS

"How DNSSEC Works" [Online] Web page <https://www.cloudflare.com/dns/dnssec/how-dnssec-works/>, 15 pages, Dec. 27, 2020 [Retrieved: Feb. 23, 2024], from Internet Archive Wayback Machine <https://web.archive.org/web/20201227130021/https://www.cloudflare.com/dns/dnssec/how-dnssec-works/> (Year: 2020).*

*Primary Examiner* — Eric W Shepperd
(74) *Attorney, Agent, or Firm* — Armstrong Teasdale LLP

(57) ABSTRACT

A trust store management system for a network communication ecosystem is provided. The system is programmed to a) receive a DNSSEC entry address of a DNSSEC entry stored at a DNSSEC server; b) transmit a request to a DNSSEC server to access information stored in the DNSSEC entry associated with the DNSSEC entry address; c) receive, from the DNSSEC server, the information stored in the DNSSEC entry; d) receive a trust store; and e) validate the trust store based on the information stored in the DNSSEC entry.

16 Claims, 7 Drawing Sheets

(56) References Cited

U.S. PATENT DOCUMENTS

| | | | |
|---|---|---|---|
| 2018/0343122 A1* | 11/2018 | Spacek | H04L 9/3247 |
| 2021/0281667 A1* | 9/2021 | Garcia-Luna-Aceves | H04L 67/63 |
| 2022/0210147 A1* | 6/2022 | Galvin | H04L 63/0823 |

* cited by examiner

ATA SYSTEMS AND METHODS FOR ADVANCED DYNAMIC TRUST STORE MANAGEMENT SYSTEMS

CROSS REFERENCE TO RELATED APPLICATIONS

This application claims the benefit of and priority to U.S. Provisional Application No. 63/153,554, filed Feb. 25, 2021, entitled "DYNAMIC TRUST STORE MANAGEMENT SYSTEM VIA DNSSEC," which is hereby incorporated by reference in its entirety.

BACKGROUND

The field of the invention relates generally to managing dynamic trust stores, and more specifically, to systems and methods for providing authenticated and secure dynamic trust stores management via Domain Name System Security Extensions (DNSSEC).

When two parties need to securely communicate, they need to have a mechanism that allow them to trust the credentials provided by the other party. Usually, this is done by embedding a set of trust anchors that allow one entity to validate the credentials from the other. In many cases, the two entities participate to the same ecosystem (e.g., the WebPKI (Web Public Key Infrastructure) or the DOCSIS® (Data Over Cable Service Interface Specification) (DOCSIS is a registered trademark of CableLabs of Denver, Colorado) environment) and the two entities already share the same authority (or set of authorities). In other cases, the set of trust anchors is disjoined, and the two entities need a mechanism to securely import the required anchors to validate the other party's credentials.

Today, there is no standardized way to securely distribute trust anchors. In particular, each of the envisioned mechanism (see Trust Anchors Management Protocol-TAMP) require the use of an already established ecosystem credential (e.g., a trusted authority).

Because of the lack of a standardized mechanism to provide an authenticated source of trust anchors, applications use trust lists (i.e., list of trusted credentials) embedded in the application itself-updates are provided on a per-application basis and are not coordinated with the ecosystem owners themselves.

Accordingly, it would be useful to have a standardized mechanism to provide authenticated sources of trust anchors.

BRIEF DESCRIPTION

In an embodiment, a trust store management system for a network communication ecosystem including a plurality of participating entities is provided. The system includes a processor in communication with the plurality of participating entities. The system also includes a memory device in operable communication with the processor. The memory device including computer-executable instructions stored therein, which, when executed by the processor, cause the processor to receive a DNSSEC entry address of a DNSSEC entry stored at a DNSSEC server. The instructions also cause the processor to transmit a request to a DNSSEC server to access information stored in the DNSSEC entry associated with the DNSSEC entry address. The instructions further cause the processor to receive, from the DNSSEC server, the information stored in the DNSSEC entry. In addition, the instructions cause the processor to receive a trust store. Moreover, the instructions cause the processor to validate the trust store based on the information stored in the DNSSEC entry.

In another embodiment, a method for trust store management is provided. The method is implemented by a computer device including at least one processor in communication with at least one memory device. The computer device is in communication with a computer network. The method includes receiving a DNSSEC entry address of a DNSSEC entry stored at a DNSSEC server. The method also includes transmitting a request to a DNSSEC server to access information stored in the DNSSEC entry associated with the DNSSEC entry address. The method further includes receiving, from the DNSSEC server, the information stored in the DNSSEC entry. In addition, the method includes receiving a trust store. Moreover, the method includes validating the trust store based on the information stored in the DNSSEC entry.

BRIEF DESCRIPTION OF THE DRAWINGS

These and other features, aspects, and advantages of the present disclosure will become better understood when the following detailed description is read with reference to the following accompanying drawings, in which like characters represent like parts throughout the drawings.

Figure 1:
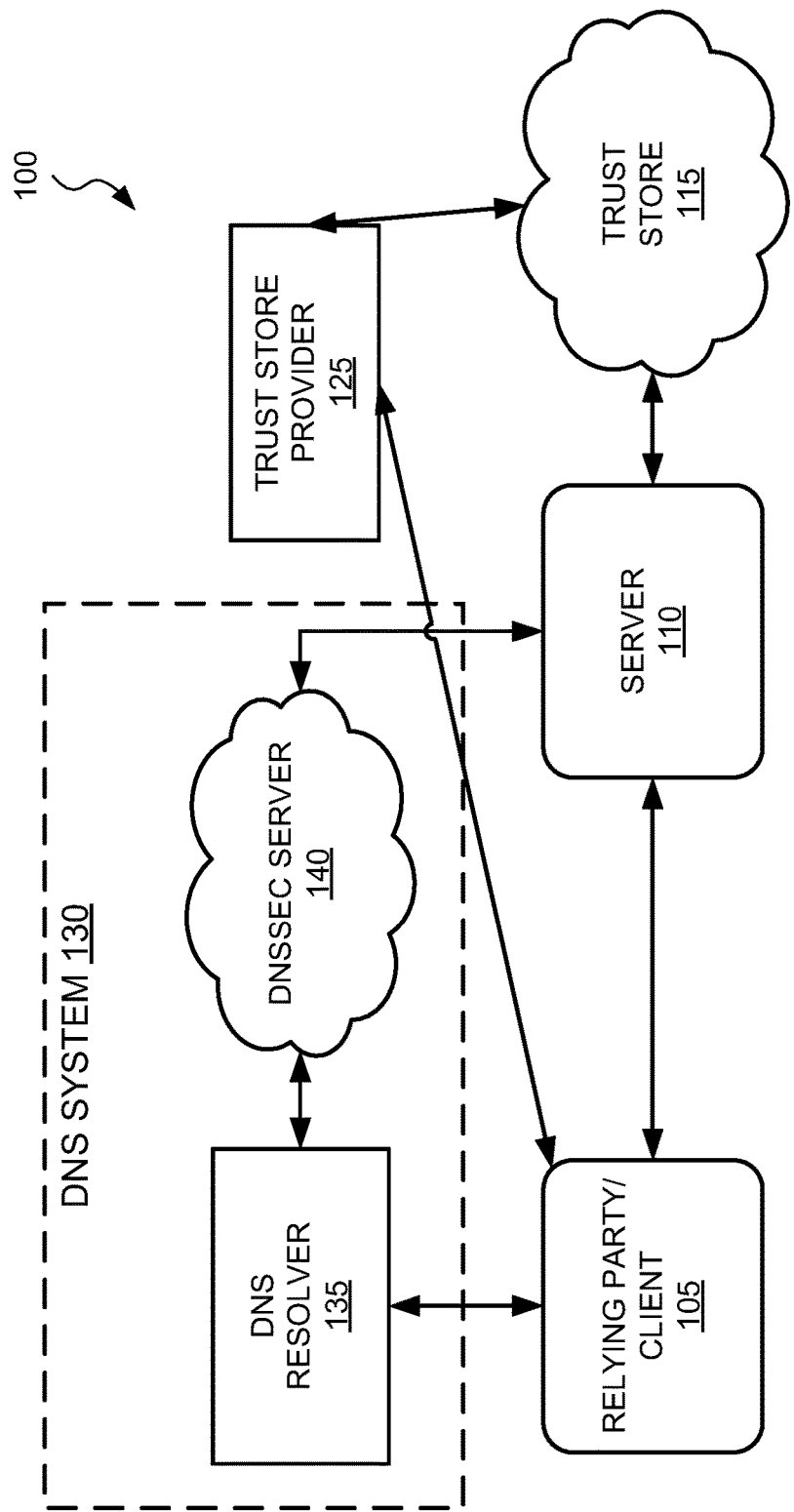
FIG. 1 illustrates a system architecture for dynamic trust store management using Domain Name System Security Extensions (DNSSEC) in accordance with at least one embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the term "database" may refer to either a body of data, a relational database management system (RDBMS), or to both, and may include a collection of data including hierarchical databases, relational databases, flat file databases, object-relational databases, object oriented databases, and/or another structured collection of records or data that is stored in a computer system. The above examples are not intended to limit in any way the definition and/or meaning of the term database. Examples of RDBMS's include, but are not limited to, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

A computer program of one embodiment is embodied on a computer-readable medium. In an example, the system is executed on a single computer system, without requiring a connection to a server computer. In a further example embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, CA). In yet a further embodiment, the system is run on a Mac OS® environment (Mac OS is a registered trademark of Apple Inc. located in Cupertino, CA). In still yet a further embodiment, the system is run on Android® OS (Android is a registered trademark of Google, Inc. of Mountain View, CA). In another embodiment, the system is run on Linux® OS (Linux is a registered trademark of Linus Torvalds of Boston, MA). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random-access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable and include any computer program storage in memory for execution by personal computers, workstations, clients, servers, and respective processing elements thereof.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events may be considered to occur substantially instantaneously.

The present embodiments are described below with respect to several components of a conventional cable and/or wireless/Wi-Fi networks. Optical networks though, are also contemplated within the scope of the present embodiments. Such optical networks may include, without limitation, an Optical Network Terminal (ONT) or Optical Line Termination (OLT), and an Optical Network Unit (ONU), and may utilize optical protocols such as EPON (ethernet passive optical network), RFOG (radio frequency over glass), or GPON (Gigabit Passive Optical Networking). Other types of communication systems our further contemplated, including communication systems capable of x-hauling traffic, satellite operator communication systems, MIMO (multiple input, multiple output) communication systems, microwave communication systems, short and long haul coherent optic systems, etc. X-hauling is defined herein as any one of or a combination of front-hauling, backhauling, and mid-hauling.

In these additional embodiments, the MTS may include, without limitation, a termination unit such as an ONT, an OLT, a Network Termination Unit, a Satellite Termination Unit, a Cable MTS (CMTS—"Cable Modem Termination System"), or other termination systems collectively referred to herein as "Modem Termination Systems (MTS)". Similarly, the modem described above may include, without limitation, a cable modem (CM), a satellite modem, an Optical Network Unit (ONU), a DSL (digital subscriber line) unit, etc., which are collectively referred to herein as "modems." Furthermore, the DOCSIS protocol may be substituted with, or further include protocols such as EPON, RFOG, GPON, Satellite Internet Protocol, without departing from the scope of the embodiments herein.

The systems and methods described herein are not limited by the networking protocol used and can be applied to a plurality of network systems and types. These systems and types can include, but are not limited to, cable, 3GPPS (3rd Generation Partnership Project) 5G (5th generation) technology, optical networks, Low Earth Orbit (LEO) networks, ethernet based networks, IEEE (Institute of Electrical and Electronics Engineers) systems (e.g., 802.11 and 16), 5G/MIMO (multiple input multiple output) (OFDM (orthogonal frequency-division multiplexing), BDMA (Beam-division multiple-access)), 4G (fourth generation) LTE (Long Term Evolution), 4G (CDMA (Code-Division Multiple Access)) WiMAX, 3G (third generation) HSPA (High Speed Packet Access)+/UMTS (Universal Mobile Telecommunications System) (WCDMA(Wideband Code Division Multiple Access)/CDMA), 2G (second generation)/GSM (Global System for Mobile communication) (TDMA(Time-division multiple access)/CDMA), Wi-Fi (all), Optical (PON(Passive optical networking)/CPON(Coherent Passive Optical Networks)/etc.), Ethernet (all: 10Base2, 10Base5, 10BaseT, 100BaseTX, 100Base FX, 1000Base SX, 1000Base LX, etc.), DSL, and RAN (Radio access network), for non-limiting examples.

The field of the disclosure relates generally to managing dynamic trust stores, and more specifically, to systems and methods for providing authenticated and secure dynamic trust stores management via Domain Name System Security Extensions (DNSSEC). This disclosure provides a mechanism to securely access the set of trust anchors identified by a CA (Certificate Authority). In particular, this disclosure describes securely distributing the location of a trust store and a verifiable way to verify its contents. This allows parties to (a) communicate to the other party the set of trust anchors used by the entity within the ecosystems of the exposed devices, and (b) to automatically retrieve the set of trust anchors needed by the entity to properly use and process its own credentials.

By providing verifiable sources of trust stores, this disclosure raises the level of security of any application as it provides the possibility to check when the set of trusted credentials change and dynamically update locally trusted ones. The set of trust anchors securely downloaded are needed for establishing the secure communication with the entity, however the trust level for the set of provided information is still defined at the application level.

The disclosure provides a system for securely distributing the location of a trust store and a verifiable way to verify its contents using DNSSEC. The system describes the basic protocol definition, the entities involved, and how the entities retrieve and/or distribute the trusted store.

The DNS system is one of the largest and most distributed databases deployed across the internet. Entities on the internet constantly access the system to query about the location (IP addresses) of services associated with domain names (e.g., "where is www.cablelabs.com ?"—"www.cablelabs.com is at 52.89.85.207"). However, the base DNS system does not provide security at any level—not from a connection point of view, nor from a data authentication one. To address this problem, the DNSSEC protocol was standardized in 1997 (and subsequently further updated). The DNSSEC does not provide privacy protections for those lookups, but prevents attackers from manipulating or poisoning the responses to DNS requests. However, the deployment of DNSSEC has been spotty and it is struggling to be universally adopted (e.g., because of the lack of support from registrars, DNSSEC deployments is often only seen in large corporate and/or government environments).

The system disclosed herein also provides a way to deliver DNSSEC as a Service—i.e., providing DNSSEC services to domains that have not deployed DNSSEC. But then allowing those domains to deliver authenticated information to clients. DNSSEC provides two different services: data authentication and data integrity. It does this by leveraging specific DNS Resource Records (RR) defined in RFC (Request For Comments) 4033 [1] and RFC 4034 [2].

The process for deploying DNSSEC protected domain involves many steps. In particular, to extend trust to a different domain, a trusted domain can provide the public key of the delegated domain in the Delegation Signer (DS) RR type. However, this delegation, requires the delegated domain to implement DNSSEC protocol, which is then not available when DNSSEC support is not present in the delegated domain.

The system described herein also provides DNSSEC as a service. The system includes basic protocol definition, the entities involved, and how the entities retrieve and/or distribute the trusted store.

FIG. 1 illustrates a system architecture 100 for dynamic trust store management using DNSSEC in accordance with at least one embodiment. The architecture 100 includes a client 105 (also known as the relying party) initiating a secure connection with another party, in this case, a server 110. The client 105 can include, but is not limited to, a user device, a computer device, a server, an application, or any other entity that can use secure credentials. The server 110 listens for another entity to connect. In some embodiments, the server 110 can act as a client 105 when needed. A trust store 115 is a set of Trusted Credentials (i.e., Keys or Certificates) that is needed to validate the credentials of the server 110. In some embodiments, the client 105 also has a trust store 115.

A trust store provider 125 can be used as a location where the trust store 115 is stored and can be downloaded from. The client 105 can connect to the trust store provider 125 using multiple connection types, including, but not limited to, HTTP (Hypertext Transfer Protocol), FTP (File Transfer Protocol), etc. A DNS system 130 contains a DNS resolver 135 and a DNSSEC Server 140. The DNS resolver 135 performs or routes the DNS lookup requests. The DNSSEC server 140 stores the information related to the authentication of the trust store 115 (i.e., a signature or a hash) that identifies the server trust store that the application needs to access. In the exemplary embodiment, a DNSSEC URI (Uniform Resource Identifier) is the address of the resource where the authentication information for the trust store 115 is saved.

In the exemplary embodiment, the client 105 attempts to securely access the server 110. The server 110 provides a DNSSEC URI is the address of the resource where the authentication information for the trust store 115 is saved. The client relies on a trusted DNSSEC URI that the client 105 can use to verify the authenticity and integrity of the trust store 115. The DNSSEC URI is securely distributed to the client 105.

The client 105 then attempts to validate the trust store 115. The client retrieves the DNSSEC URI where the trust store 115 authentication information is stored. In some embodiments, the DNSSEC URI is provided by the server 110. In other embodiments, the DNSSEC URI is available via a third party, such as via a look-up. The client 105 queries the DNSSEC URI for the authentication information of the store. In some embodiments, the DNS entry contains the authentication (e.g., the signature or a hash) of the trust store 115 the client 105 is trying to verify/retrieve. In some additional embodiment, the DNS entry also contains an indication of which algorithm was used to calculate the authentication data. In some further embodiments, the DNS entry contains the URL (uniform resource locator) where the trust store 115 can be downloaded from, such as the location of the trust store provider 125.

The client 105 validates the data retrieved from the DNSSEC URI according to the procedures for validating DNSSEC entries. Additionally, the client 105 can determine if the trust store 115 has been updated by checking the authentication information from the DNS. If the information is changed, then the trust store 115 has been updated. The client 105 can retrieve the trust store 115 from the URL in the DNS or provided by other means, such as a redirect from the trust store provider 125.

The client 105 verifies that the authentication data retrieved from the DNSSEC URI and the trust store 115 match. The DNSSEC server 140 protects the data from the DNSSEC URI while the authentication data from the DNSSEC URI protects the trust store 115 against modification.

Figure 2:
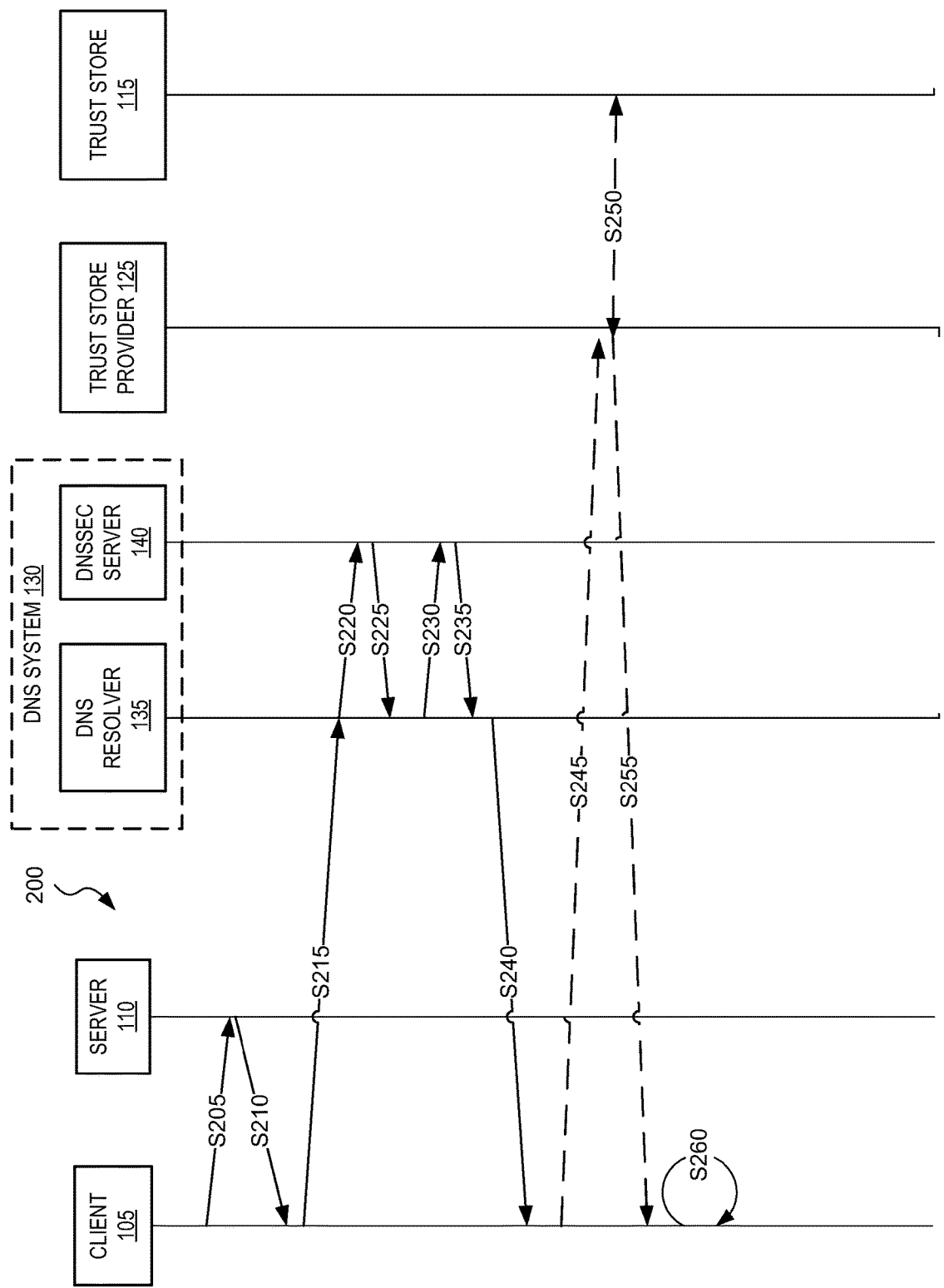
FIG. 2 illustrates timing diagram for a process for validating a trust store as shown in FIG. 1.

FIG. 2 illustrates timing diagram for a process 200 for validating a trust store 115. In the exemplary embodiment, process 200 is performed by the system architecture 100 (shown in FIG. 1).

In step S205, the client 105 contacts the server 110. The contact may be the initial contact message to create a connection between the client 105 and the server 110. In step S210, the server 110 responds with a DNSSEC URI, which acts as a verifiable ID. In some embodiments, the server 110 also provides the trust store 115 and/or the location of the trust store provider 125. The DNSSEC URI directs the client 105 to information, such as that shown in SDU (service data unit) data 300 (shown in FIG. 3).

The client 105 then queries the DNSSEC URI for the authentication information for the trust store 115. The client 105 uses the DNSSEC URI to access the DNS system 130. In step S215, the client 105 uses the DNSSEC URI to access the DNS resolver 135 to request the SDU data 300 associated with the DNSSEC URI. In steps S220 and S225, the DNS resolver 135 and the DNSSEC server 140 perform the query and response to authenticate the DNSSEC server 140. Then in step S230, the DNS resolver 135 requests the SDU data 300 indicated by the DNSSEC URI from the DNSSEC server 140. In step S235, the DNSSEC server 140 returns the SDU data 300 to the DNS resolver 135. In step S240, the DNS resolver 135 returns the SDU data 300 to the client 105.

In some embodiments, the client 105 has already received the trust store 115, such as from the server 110 or in the SDU data 300 itself. In these embodiments, the client 105 proceeds to step S260 to validate the record and the trust store 115.

In other embodiments, the SDU data 300 includes the location of the trust store provider 125 that stores the trust store 115. In these embodiments, the client 105 requests S245 the trust store 115 from the trust store provider 125, such as by using the location provided in the SDU data 300. In some embodiments, the location may be a URL, an FTP address, or other indicator of the location of the trust store 115. The trust store provider 125 retrieves S250 the trust store 115. The trust store provider 125 forwards S255 the retrieved trust store 115 to the client 105.

In step S260, the client 105 validates the returned record. In the exemplary embodiment, the SDU data 300 includes a signature, such as an authentication hash. The client 105 validates the signature based on the information in the trust store 115. In some embodiments, the SDU data 300 includes the algorithm indicator for validating the signature. In other embodiments, the algorithm indicator is stored in the trust store 115. Once the client 105 validates the signature, the client 105 can use the trust store 115 to securely connect to the server 110.

The process 200 can also be used to securely provide updated credentials and/or replace certificates. Additionally when devices get on a new network, they might be required to validate the identity of authentication servers and/or other support systems provided by the infrastructure.

The local network can provide the indication about which trust store 115 is needed by providing the indication of the DNSSEC URI to joining clients 105 (e.g., via a new DHCP (Dynamic Host Configuration Protocol) option, a broadcasted value, etc.).

The provisioning of the authenticated data can also be provided via a "well known" local domain address. For example, any client can retrieve the suggested trust store settings for the network by querying:

dnssec://localstore.localdomain

The returned data can be validated by the client 105 by using the DNSSEC specific mechanism, and the trust store 115 can be retrieved and verified when or if the client 105 needs or requires it.

If the entity that runs the DNSSEC domain is trusted to provide trust anchors, then the client 105 can trust the use of the retrieved trust store 115.

The DNSSEC URI shall provide the client 105 with the indication of how to retrieve the authentication information needed to validate the trust store 115. Because this disclosure uses the security of the DNSSEC 140 to validate the trust store 115, this disclosure requires the use of the 'dnssec' scheme to require the use of DNSSEC 140 for distributing the trust store 115 authentication information.

A DNS URL [RFC3986] begins with the protocol prefix "dns" and is defined by the following grammar, following the ABNF notation defined in [RFC5234]. As used herein, the "scheme" portion is re-defined as "dnssec" instead of "dns". The notation is as follows:

dnsurl=scheme COLON SLASH [target]
  [QUESTION [TYPE-rr_type]
    ; target: is the dns entry for ; the lookup operation.
; rr_type: is the type of record
; to be retrieved. If not specified,
; the default type is TEXT
scheme="dnssec"
SLASH= % x2F; forward slash ("/")
COLON= % x3A; colon (":")
QUESTION= % x3F; question mark ("?")
For example, a valid DNSSEC URI is as follows:
dnssec://
  04A3E45534A1B5.cal.example.com?type=TEXT The DNSSEC URI can be distributed in an X.509 extension that can be added to any certificate to indicate the suggested set of trust anchor.

The URI can also be added as a separate extension:
id-ce-trustStoreUri OBJECT IDENTIFIER:={X}
  TrustStoreUri:=SEQUENCE {
    storeUri IA5 String,
      URI value where to download the store}

The URI can also be carried in the ("Authority Information Access") extension under a different access method. In particular, a new access method, namely the ("id-ad-trustStore") access method can be defined as:
id-ad-trustStore OBJECT IDENTIFIER:={X}

In this case, the ("Authority Information Access") would have the ("id-ad-trustStore") OID (Object Identifier) as the accessMethod, while for the accessLocation it would have the ("dnssec://") URI encoded in the uniformResourceIdentifier of the GeneralName structure.

Figure 3:
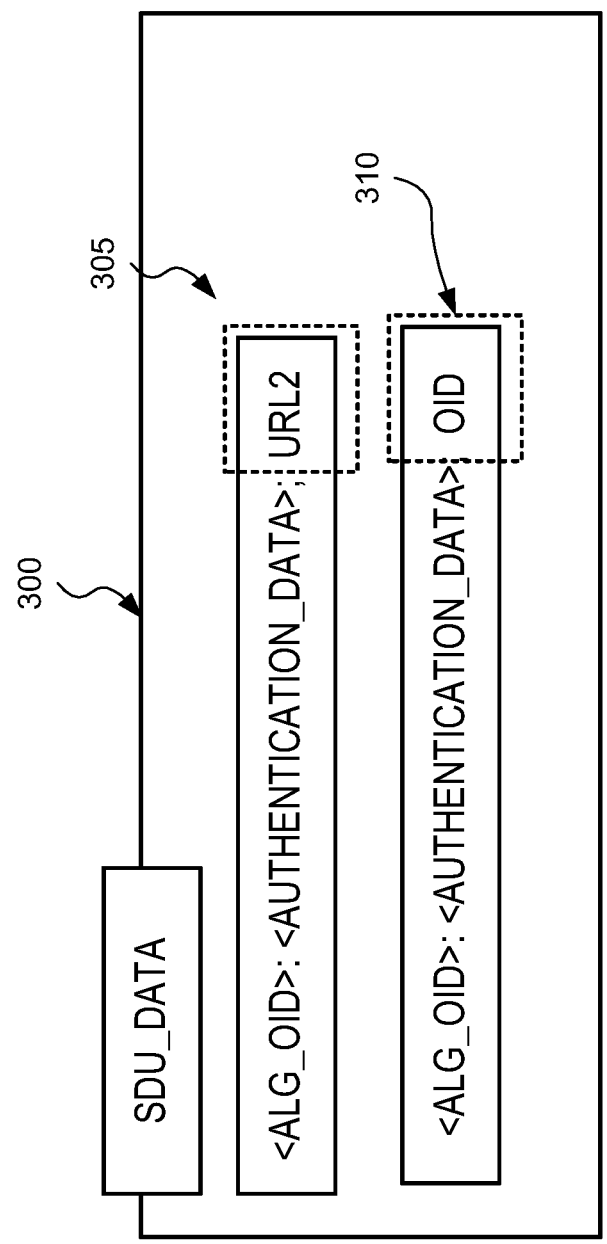
FIG. 3 illustrates an exemplary data structure for authentication data stored by the DNSSEC server shown in FIG. 1.

FIG. 3 illustrates an exemplary data structure 300 for authentication data stored by the DNSSEC server 140 (shown in FIG. 1). SDU (service data unit) data 300 for storing the DNSSEC Trust Store Authentication Data can be store in multiple different way.

A first SDU datablock 305 is defined as follows:
<alg_oid>; <hex_hash_value>[; <Trust Store URL>]
where the <alg_oid> identifies the algorithm used for calculating the authentication data (i.e., the auth_hex_value). The trust store URL is the location of the trust store 115 (shown in FIG. 1) associated with the datablock 305. The algorithm identifier can be implemented via a simple identifier from a list or by using an existing "global" identifier (e.g., the dotted representation of the Algorithm Identifiers as defined by IANA).

A second SDU datablock 310 is defined as follows:
<alg_oid>; <hex_hash_value>[; <Trust Store OID>]
  where the <Trust Store OID> identifies a location of the trust store 115.

In both the first datablock 305 and the second datablock 310 the location of the trust store 115 is optional. In some embodiments, the server 110 (shown in FIG. 1) provides the trust store 115 or the location of the trust store provider 125 in response to the query from the client 105 (shown in FIG. 1).

Figure 4:
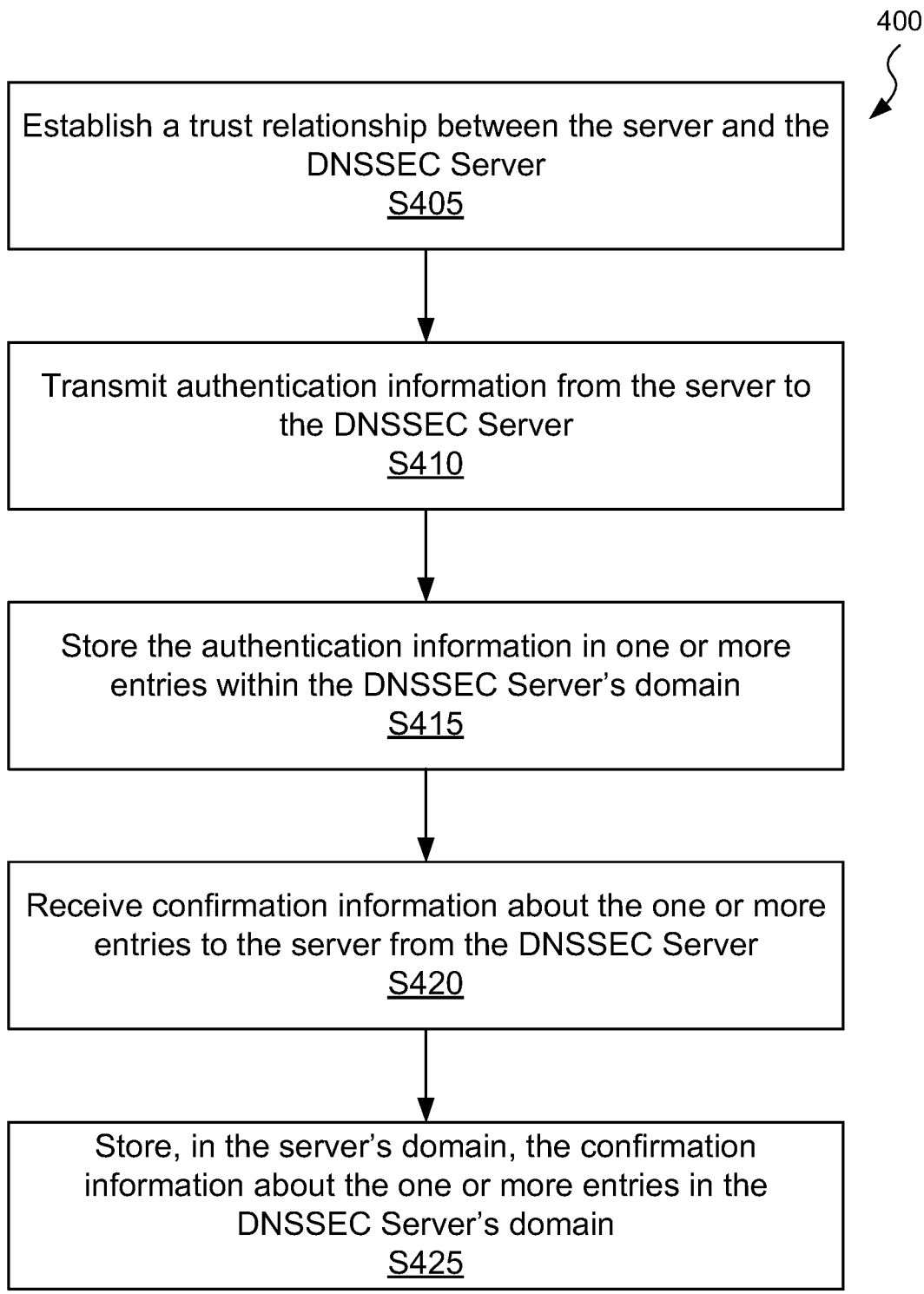
FIG. 4 illustrates a process for registering a server for providing DNSSEC as a service using the system shown in FIG. 1.

FIG. 4 illustrates a process 400 for registering a server for providing DNSSEC as a service using the system architecture 100 (shown in FIG. 1). In the exemplary embodiment, process 400 is performed by the system architecture 100.

For the discussion on DNSSEC as a service, the client 105 is the entity querying the DNS system 130 (both shown in FIG. 1) for information. The server 110 (shown in FIG. 1) is the authoritative server for the domain that the client 105 is trying to query. The server 110 does not offer DNSSEC services and would like to leverage the DNSSEC as a Service provided by the DNSSEC server 140 (also known as DNSSEC provider) (shown in FIG. 1). For the purposes of this discussion, the domain managed by the server 110 will be referenced to as "origin.example".

The DNSSEC server 140 is the authoritative server for the DNSSEC protected domain that the server 110 wants to leverage to provide authenticated information. The DNSSEC server 140 managed domain is referenced in this discussion as "protected.example". The DNSSEC Server 140 provides storage (in dedicated DNS records) for (a) the data that needs to be authenticated (if small), or (b) the hash of the data that needs to be authenticated, or (c) the public key of the server 110 that the server 110 can use to directly sign its own records (not DNSSEC records, but "normal" entries (i.e., stand-alone signed records).

The DNSSEC URI is the address of the resource where the authentication information is stored by the DNSSEC Server 140. The DNSSEC URI can be distributed directly to applications or can be referenced by a signed record in the server's origin domain (i.e., "<entry>.origin.example"). The Server's Public Key is available through a DNSSEC protected entry or directly trusted by applications (i.e., offline or in-app secure distribution).

The DNS URI is the address of the resource where the delegation token from the server's domain (i.e., origin.example) is stored (method 1 described in processes 400 and 500) or where the authentication data for the non-DNS data to be authenticated (e.g., a Trust Store 115) is located. This DNS URI can be used by clients 105 to verify that the data stored at the DNSSEC server 140 was authorized by the entity controlling the server's domain (method 1 described in processes 400 and 500) or to directly validate the non-DNS data to be authenticated (method 2 described in processes 600 and 700).

The process to provide DNSSEC as a Service can be split into two different processes. First is the Registration Process. In this phase a direct relationship is established between the DNSSEC server 140 and the server 110. In particular, during this phase, the data is identified that should be stored at a delegated "entry" in the DNSSEC server's domain from an "entry" in the server's domain. This ensures that the server's entity is securely identified and that the data to be stored in the DNSSEC domain is transferred securely from the server 110 to the DNSSEC server 140. The specific process for securely registering the server 110 can be specific to the internal procedures of the DNSSEC Server 140.

The second process is the authentication process. The authentication process describes the procedures required by a client 105 to verify the information in the DNSSEC Server's domain and the validity of the delegation from the Server 110 domain (i.e., verifying that the two entities have worked together and that the server 110 is the actual owner of that data).

The first method described in this invention leverages the DNSSEC server's domain space to provide authentication for data stored outside the server's DNS server (e.g., a data structure stored in a HTTP server).

Process 400 describes the first method's registration process.

In step S405, a trust relationship is established between the DNSSEC server 140 and the server 110. These are the two entities have to add data to their DNS system 130 that the client 105 can access and verify.

In step S410, the server 110 transmits authentication information to the DNSSEC server 140. The authentication information can include, for example, the HASH of the Trust Store 115, or, if possible, the data to be authenticated itself. In step S415, the DNSSEC server 140 stores the authentication information in one or more entries. In step S420, the DNSSEC server 140 transmits confirmation information about the one or more entries to the server 110. In some embodiments, the confirmation information includes, for example, the DNSSEC URI's associated with the entries. In other embodiments, where the DNSSEC could not be distributed securely to clients 105, the confirmation information includes, for example, an embedded URL in an authenticated data structure like a digital certificate or an authentication token. In step S425, the server 110 stores the confirmation information for the one or more entries. In the above process 400, whenever the data to be authenticated (i.e., the trust store 115) is changed, both the entry in the DNSSEC Server's space and (if available) the entry in the server's domain space must be updated. The Information about the changes in the data to be authenticated can then be communicated securely from the server 110 to the DNSSEC server 140.

Figure 5:
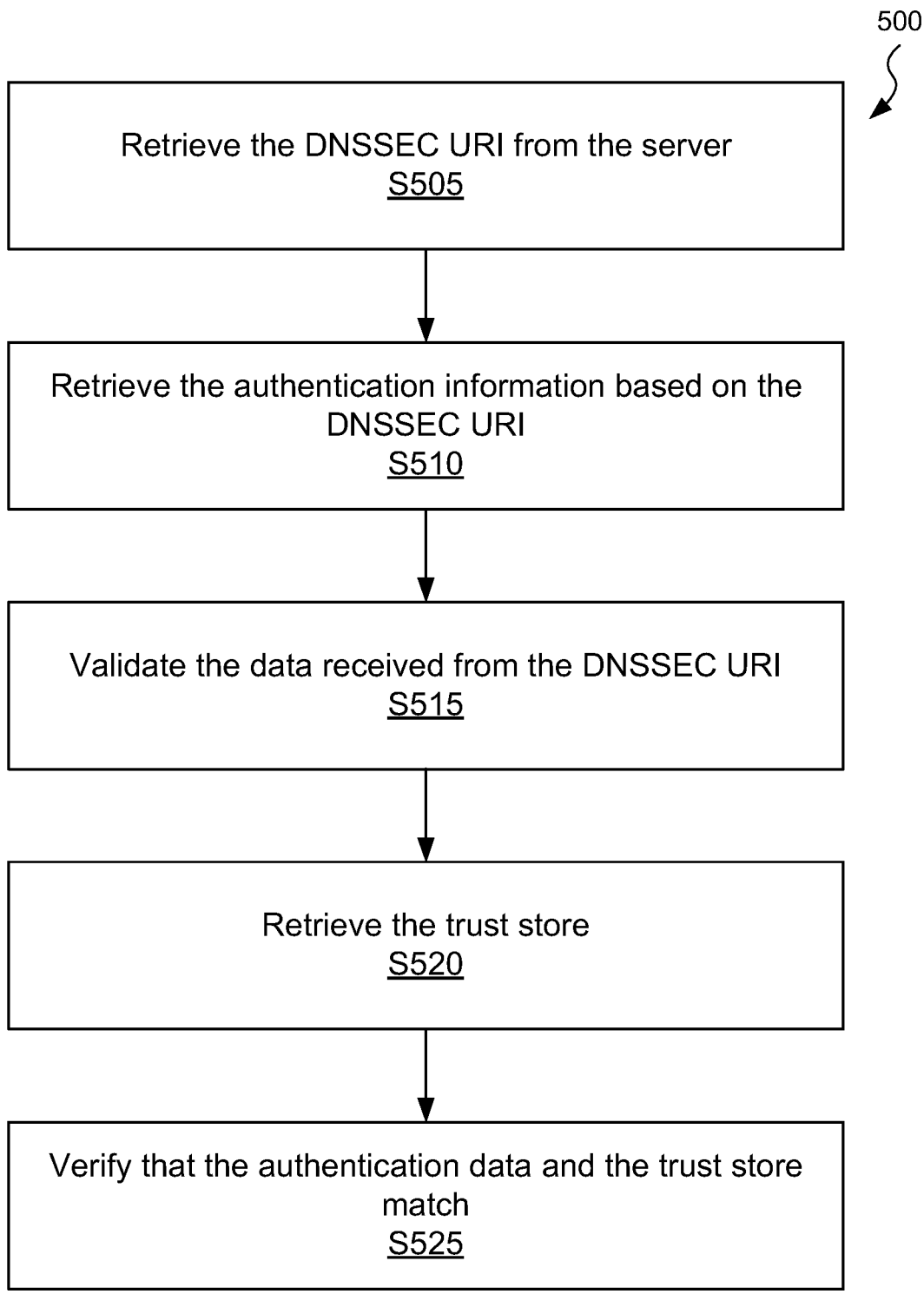
FIG. 5 illustrates a process for authenticating a server using DNSSEC as a service using the system shown in FIG. 1.

FIG. 5 illustrates a process 500 for authenticating a server using DNSSEC as a service using the system architecture 100 (shown in FIG. 1). In the exemplary embodiment, process 500 uses the system architecture 100 and many of the steps are performed by the client 105. Process 500 describes the first method's validation process to validate a DNSSEC-as-a-Service entry.

In step S505, the client 105 (shown in FIG. 1) retrieves (or checks) the DNSSEC URI where the trust Store 115 (shown in FIG. 1) authentication information is stored. In some embodiments, the client 105 retrieves the DNSSEC URI from the server 110. In other embodiments, the DNSSEC URI is embedded in a digital certificate or provided through a look-up table or request.

In step S510, the client 105 queries the DNSSEC server 140 (shown in FIG. 1) with the DNSSEC URI to retrieve the authentication information of the trust store 115. In some embodiments, the DNSSEC entry contains the authentication (e.g., the signature or a hash) of the trust store 115 the client 105 is trying to verify/retrieve. In other embodiments, the DNS entry also contains the indication of which algorithm was used to calculate the authentication data and/or the URL where the ("Trust Store") can be downloaded from.

In step S515, the client 105 validates the data retrieved from the DNSSEC URI according to the procedures for validating DNSSEC entries. In some further embodiments, the client 105 can determine if the trust store 115 has been updated by checking the authentication information from the DNSSEC server 140.

In step S520, the client 105 retrieves the trust store 115 from the URL provided by the DNSSEC server 140 or by other means, such as directly from the server 110. In step S525, the client 105 verifies that the authentication data retrieved from the DNSSEC URI and the trust store 115 match. The DNSSEC protects the data from the DNSSEC URI while the authentication data from the DNSSEC URI protects the trust store 115 against modification.

The second method described in this disclosure leverages the DNSSEC Server's domain space to provide authentication for DNS entries in the server's DNS system 130. In this method, the server's domain supports a DNS system 130, but not a DNSSEC server 140.

On the DNSSEC Server's domain, one or more entries must exist that carry the authentication information (e.g., the HASH or a signature) of the data stored in the server's entry. On the server's domain, one or more entries are used to provide the authenticated data (in Method 1, the data is stored in the DNSSEC Server's domain instead). For example, the server 110 sets up the record for ("entry1.origin.example") where the HASH of the non-DNS data that is to be authenticated (e.g., a trust store 115 is saved. The corresponding entry in the DNSSEC Server's domain contains the HASH of the data stored in the server's domain—i.e., ("entry1.origin.example"). The trust stems from the DNSSEC authentication of the HASH stored in the DNSSEC Server 140. From there, the HASH is used to authenticate the contents of the ("DNS URI") entry which, in turn, authenticates the non-DNS data.

Also in this case, whenever the data to be authenticated (i.e., the trust store 115) is changed, both the entry in the DNSSEC Server's space and (if available) the entry in the server's domain space are updated. In this case, the information about the changes in the data to be authenticated is communicated securely from the server 110 to the DNSSEC Server 140 and can be directly verified by the DNSSEC Server 140 for further validation (via simple DNS queries). The DNSSEC Server 140 does not need access to the non-DNS data.

To validate the DNSSEC-as-a-Service entries, the client 105 retrieves the entry from the DNS URI in the server's domain space (e.g., "entry 1.origin.example"). The client 105 retrieves (or checks) the corresponding DNSSEC URI where the authentication information related to the server's entry is stored. This authentication information is retrieved from the server's entry directly or by other methods. The client 105 queries the DNSSEC URI for the authentication information and checks that the data in the server's entry can be successfully verified. The client 105 retrieves the non-DNS data from the entry corresponding to the DNS URI in the DNS system 130 (or provided by other means). The client 105 uses the authentication data retrieved from the server's entry to verify the authenticity and integrity of the non-DNS data match (i.e., the entry's data in the server's domain is authenticated via the DNSSEC query, while the data in the trust store 115 is authenticated by the data in the server's entry.

This disclosure uses two different structures to convey the location of the authentication data and the delegation data itself. The DNSSEC Entry contains the information that the server 110 wants to be securely stored (authenticated) by the DNSSEC Server 140. The entry contains, at minimum, the authentication data (e.g., the HASH of the non-DNS data) or the data itself (i.e., the non-DNS data itself, if it fits the DNS size limitations). In some embodiments, the entry contains a reference to the server's DNS entry that points to the DNSSEC entry.

In some embodiments, the data is encoded in a TXT (text) record or in a binary record—the query URI shall provide the type of Resource Record (RR) that should be queried. The default RR type is TXT, and the data format is TEXT, JSON (JavaScript Object Notation), XML (Extensible Markup Language), or DER (distributed energy resource). The data structures can contain, but are not limited to, "non-DNS data"—the sata for the trust store 115 itself; "OID"—this is the identifier for the algorithm used to calculate the HASH of the data, and "DNS Server's Entry"—The entry in the server's DNS space that references the DNSSEC entry in the DNSSEC Server 140 domain space.

For the DNSSEC entry data, the HASH is calculated over the non-DNS data that must be authenticated for Method 1 and the HASH is calculated over the data from the ("DNS URI") entry for Method 2.

Additionally, the following notation are used below where applicable:

[ . . . ]: Indicates Optional Fields (Separators ";" are always required)
< . . . >: Indicates a value
Base64( ): Indicates that the value is encoded according to the Base64 algorithm.

The TXT format for the DNSSEC entry data is defined as:
"data:<base64(non-DNS data)>"
[alg:<OID>]; value:<base64(HASH)>; [ref:<DNS Server's Entry>]"

In Method 1, the HASH is calculated over the non-DNS data that must be authenticated. In Method 2, the HASH is calculated over the data from the ("DNS URI") entry.

The JSON format for the DNSSEC entry data is defined as:
{"data":"base64(TrustStoreData)" [,"ref": "<DNS Server's Entry>"]}
{["alg":"OID",] "value":base64(HASH) [,"ref": "<DNS Server's Entry>"]}

In Method 1, the HASH is calculated over the non-DNS data that must be authenticated. In Method 2, the HASH is calculated over the data from the ("DNS URI") entry.

The XML format for the DNSSEC entry data is defined as:
<!—Direct Data authentication—>
<auth>
<data "encoding"="base64">base64(non-DNS data)</data>
<!—The ref field is optional—>
<ref>("<DNS Server's Entry>")</ref>
</auth>
<!—Indirect Direct Data authentication—>
<auth>
<alg "oid"="<OID>">base64(HASH)</alg>
<ref>("DNS Server's Entry")</ref>
</auth>

The ASN. 1 definition for the DER format for the DNSSEC entry data is defined as:
DAASDirectAuth:=SEQUENCE {
 data OCTET STRING,
 ref UTF8 STRING OPTIONAL
}
DAASIndirectAuth:=SEQUENCE {
 algorithm OBJECT IDENTIFIER,
 hash Value OCTET STRING,
 referenceUri UTF8 STRING OPTIONAL
}

Figure 6:
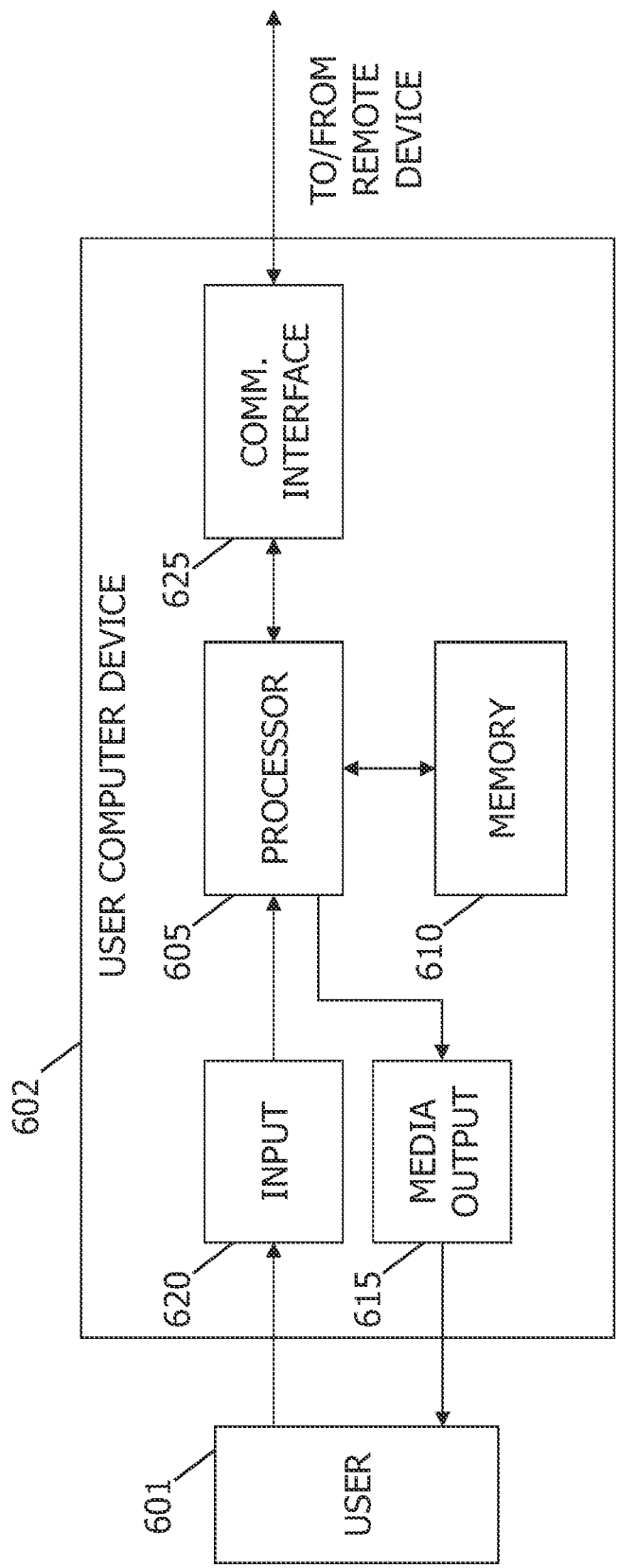
FIG. 6 illustrates an example configuration of a client system shown in FIG. 1, in accordance with one embodiment of the present disclosure.

FIG. 6 illustrates an example configuration of a client system shown in FIG. 3, in accordance with one embodiment of the present disclosure. User computer device 602 is operated by a user 601. User computer device 602 may include, but is not limited to, client 105 (shown in FIG. 1). User computer device 602 includes a processor 605 for executing instructions. In some embodiments, executable instructions are stored in a memory area 610. Processor 605 may include one or more processing units (e.g., in a multi-core configuration). Memory area 610 is any device allowing information such as executable instructions and/or transaction data to be stored and retrieved. Memory area 610 may include one or more computer-readable media.

User computer device 602 also includes at least one media output component 615 for presenting information to user 601. Media output component 615 is any component capable of conveying information to user 601. In some embodiments, media output component 615 includes an output adapter (not shown) such as a video adapter and/or an audio adapter. An output adapter is operatively coupled to processor 605 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some embodiments, media output component 615 is configured to present a graphical user interface (e.g., a web browser and/or a client application) to user 601. A graphical user interface may include, for example, analysis of a trust store 115. In some embodiments, user computer device 602 includes an input device 620 for receiving input from user 601. User 601 may use input device 620 to, without limitation, select and/or enter one or more changes to a trust store 115. Input device 620 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 615 and input device 620.

User computer device 602 may also include a communication interface 625, communicatively coupled to a remote device such as server 110, DNS resolver 135, DNSSEC server 140, or trust store provider 125 (all shown in FIG. 1). Communication interface 625 may include, for example, a wired or wireless network adapter and/or a wireless data transceiver for use with a mobile telecommunications network.

Stored in memory area 610 are, for example, computer-readable instructions for providing a user interface to user 601 via media output component 615 and, optionally, receiving and processing input from input device 620. The user interface may include, among other possibilities, a web browser and/or a client application. Web browsers enable users, such as user 601, to display and interact with media and other information typically embedded on a web page or a website provided by server 110. A client application allows user 601 to interact with, for example, server 110. For example, instructions may be stored by a cloud service and the output of the execution of the instructions sent to the media output component 615.

Figure 7:
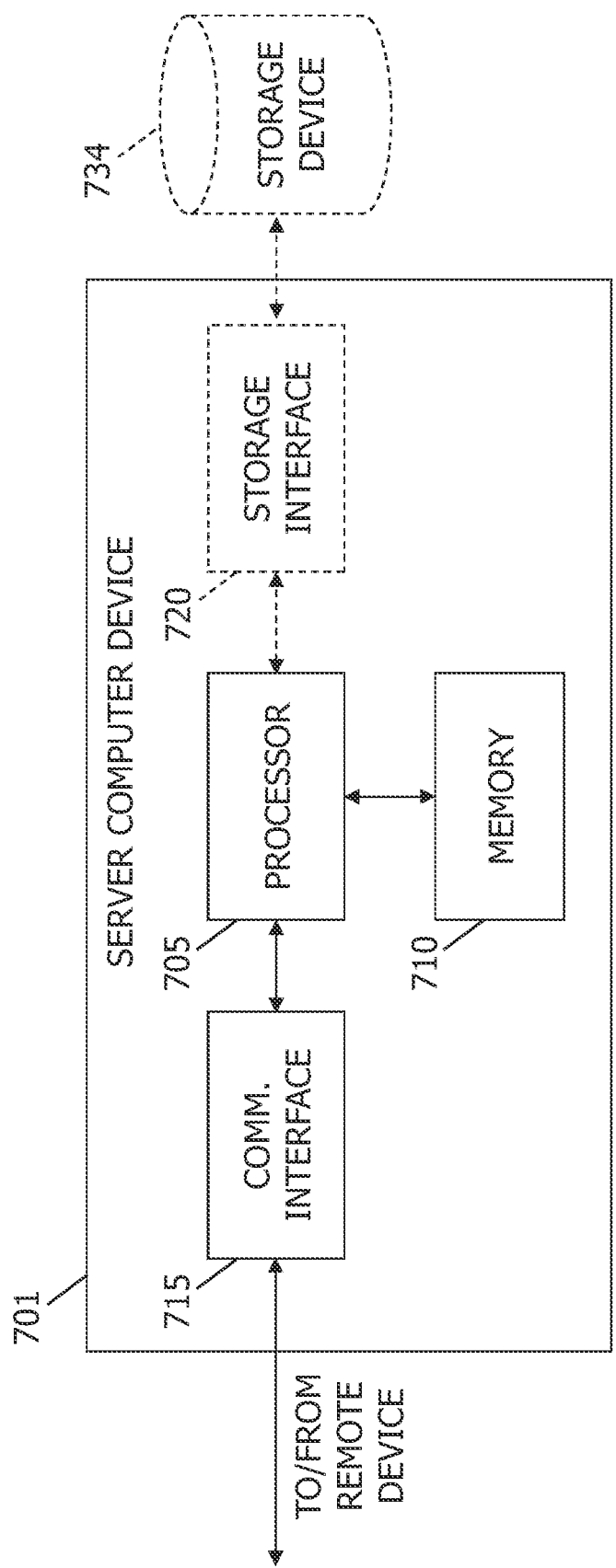
FIG. 7 illustrates an example configuration of a server system shown in FIG. 3, in accordance with one embodiment of the present disclosure.

FIG. 7 illustrates an example configuration of a server system shown in FIG. 3, in accordance with one embodiment of the present disclosure. Server computer device 701 may include, but is not limited to, client 105, server 110, trust store provider 125, DNS resolver 135, and DNSSEC server 140 (all shown in FIG. 1). Server computer device 701 also includes a processor 705 for executing instructions. Instructions may be stored in a memory area 710. Processor 705 may include one or more processing units (e.g., in a multi-core configuration).

Processor 705 is operatively coupled to a communication interface 715 such that server computer device 701 is capable of communicating with a remote device such as another server computer device 701, client 105 or trust store provider 125. For example, communication interface 715 may receive requests from client 105 or server 110 via the Internet.

Processor 705 may also be operatively coupled to a storage device 734. Storage device 734 is any computer-operated hardware suitable for storing and/or retrieving data, such as, but not limited to, data associated with a database. In some embodiments, storage device 734 is integrated in server computer device 701. For example, server computer device 701 may include one or more hard disk drives as storage device 734. In other embodiments, storage device 734 is external to server computer device 701 and may be accessed by a plurality of server computer devices 701. For example, storage device 734 may include a storage area network (SAN), a network attached storage (NAS) system, and/or multiple storage units such as hard disks and/or solid state disks in a redundant array of inexpensive disks (RAID) configuration.

In some embodiments, processor 705 is operatively coupled to storage device 734 via a storage interface 720. Storage interface 720 is any component capable of providing processor 705 with access to storage device 734. Storage interface 720 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 705 with access to storage device 734.

Processor 705 executes computer-executable instructions for implementing aspects of the disclosure. In some embodiments, processor 705 is transformed into a special purpose microprocessor by executing computer-executable instructions or by otherwise being programmed.

The computer-implemented methods and processes described herein may include additional, fewer, or alternate actions, including those discussed elsewhere herein. The present systems and methods may be implemented using one or more local or remote processors, transceivers, and/or sensors (such as processors, transceivers, and/or sensors mounted on vehicles, stations, nodes, or mobile devices, or associated with smart infrastructures and/or remote servers), and/or through implementation of computer-executable instructions stored on non-transitory computer-readable media or medium. Unless described herein to the contrary, the various steps of the several processes may be performed in a different order, or simultaneously in some instances.

Additionally, the computer systems discussed herein may include additional, fewer, or alternative elements and respective functionalities, including those discussed elsewhere herein, which themselves may include or be implemented according to computer-executable instructions stored on non-transitory computer-readable media or medium.

In the exemplary embodiment, a processing element may be instructed to execute one or more of the processes and subprocesses described above by providing the processing element with computer-executable instructions to perform such steps/sub-steps, and store collected data (e.g., trust stores, authentication information, etc.) in a memory or storage associated therewith. This stored information may be used by the respective processing elements to make the determinations necessary to perform other relevant processing steps, as described above.

The aspects described herein may be implemented as part of one or more computer components, such as a client device, system, and/or components thereof, for example. Furthermore, one or more of the aspects described herein may be implemented as part of a computer network architecture and/or a cognitive computing architecture that facilitates communications between various other devices and/or components. Thus, the aspects described herein address and solve issues of a technical nature that are necessarily rooted in computer technology.

Furthermore, the embodiments described herein improve upon existing technologies, and improve the functionality of computers, by more reliably protecting the integrity and efficiency of computer networks and the devices on those networks at the server-side, and by further enabling the easier and more efficient identification of trusted devices at the server-side and the client-side. The present embodiments therefore improve the speed, efficiency, and reliability in which such determinations and processor analyses may be performed. Due to these improvements, the aspects described herein address computer-related issues that significantly improve the efficiency of transmitting messages in comparison with conventional techniques. Thus, the aspects herein may be seen to also address computer-related issues such as dynamic network settings for different devices on network between electronic computing devices or systems, for example.

Exemplary embodiments of systems and methods for category based network device and traffic identification and routing are described above in detail. The systems and methods of this disclosure though, are not limited to only the specific embodiments described herein, but rather, the components and/or steps of their implementation may be utilized independently and separately from other components and/or steps described herein.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

The computer-implemented methods discussed herein may include additional, less, or alternate actions, including those discussed elsewhere herein. The methods may be implemented via one or more local or remote processors, transceivers, servers, and/or sensors, and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A trust store management system for a network communication ecosystem including a plurality of participating entities, comprising:
 a processor in communication with the plurality of participating entities; and
 a memory device in operable communication with the processor, the memory device including computer-executable instructions stored therein, which, when executed by the processor, cause the processor to:
 request access to a first server;
 receive, from the first server, a DNSSEC entry address of a DNSSEC entry stored at a DNSSEC server, wherein the DNSSEC server is different from the first server;
 transmit a request to the DNSSEC server to access information stored in the DNSSEC entry associated with the DNSSEC entry address;
 receive, from the DNSSEC server, the information stored in the DNSSEC entry, wherein the information includes authentication information for a trust store and a location of the trust store;
 receive the trust store from the location of the trust store, wherein the location of the trust store is different from the DNSSEC server and the first server; and
 validate the trust store based on the authentication information stored in the DNSSEC entry.

2. The system of claim 1, wherein the information stored in the DNSSEC entry includes a hash of at least a portion of the trust store.

3. The system of claim 1, wherein the information stored in the DNSSEC entry includes an algorithm identifier to identify an algorithm to validate the trust store.

4. The system of claim 1, wherein the information stored in the DNSSEC entry includes a trust store address of where the trust store is stored.

5. The system of claim 4, wherein the trust store is stored by a trust store provider at the trust store address, and wherein the instructions further cause the processor to retrieve the trust store from the trust store provider.

6. The system of claim 1, wherein the instructions further cause the processor to:
 receive the DNSSEC entry address from the first server.

7. The system of claim 6, wherein the DNSSEC server is supported by a domain of the first server.

8. The system of claim 6, wherein the DNSSEC server is separate from a domain of the first server.

9. A method for trust store management, wherein the method is implemented by a computer device comprising at least one processor in communication with at least one memory device, wherein the computer device is in communication with a computer network, and wherein the method comprises:
 request access to a first server;
 receiving, from the first server, a DNSSEC entry address of a DNSSEC entry stored at a DNSSEC server, wherein the DNSSEC server is different from the first server;
 transmitting a request to the DNSSEC server to access information stored in the DNSSEC entry associated with the DNSSEC entry address;
 receiving, from the DNSSEC server, the information stored in the DNSSEC entry, wherein the information includes authentication information for a trust store and a location of the trust store;
 receiving the trust store from the location of the trust store, wherein the location of the trust store is different from the DNSSEC server and the first server; and
 validating the trust store based on the authentication information stored in the DNSSEC entry.

10. The method of claim 9, wherein the information stored in the DNSSEC entry includes a hash of at least a portion of the trust store.

11. The method of claim 9, wherein the information stored in the DNSSEC entry includes an algorithm identifier to identify an algorithm to validate the trust store.

12. The method of claim 9, wherein the information stored in the DNSSEC entry includes a trust store address of where the trust store is stored.

13. The method of claim 12, wherein the trust store is stored by a trust store provider at the trust store address, and wherein the method further comprises retrieving the trust store from the trust store provider.

14. The method of claim 9 further comprising
 receiving the DNSSEC entry address from the first server.

15. The method of claim 14, wherein the DNSSEC server is supported by a domain of the first server.

16. The method of claim 14, wherein the DNSSEC server is separate from a domain of the first server.

* * * * *